United States Patent
Nge et al.

(10) Patent No.: US 11,429,173 B2
(45) Date of Patent: Aug. 30, 2022

(54) APPARATUS AND METHOD FOR PROACTIVE POWER MANAGEMENT TO AVOID UNINTENTIONAL PROCESSOR SHUTDOWN

(71) Applicant: Intel Corporation, Santa Clara, CA (US)

(72) Inventors: Chee Lim Nge, Beaverton, OR (US); Amit Jain, Portland, OR (US); Anant Deval, Portland, OR (US); Nimrod Angel, Haifa (IL); Fabrice Paillet, Portland, OR (US); Michael Zelikson, Haifa (IL); Sergio Carlo Rodriguez, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 249 days.

(21) Appl. No.: 16/230,440

(22) Filed: Dec. 21, 2018

(65) Prior Publication Data
US 2019/0146569 A1    May 16, 2019

(51) Int. Cl.
*G06F 1/26* (2006.01)
*G06F 1/32* (2019.01)
(Continued)

(52) U.S. Cl.
CPC .......... *G06F 1/3206* (2013.01); *G06F 1/206* (2013.01); *G06F 1/3296* (2013.01); *H02M 1/08* (2013.01);
(Continued)

(58) Field of Classification Search
None
See application file for complete search history.

(56) References Cited

U.S. PATENT DOCUMENTS

| | | | |
|---|---|---|---|
| 6,470,289 B1* | 10/2002 | Peters | G01K 7/42 |
| | | | 702/132 |
| 8,680,821 B2* | 3/2014 | Vogman | H02M 3/156 |
| | | | 323/222 |

(Continued)

FOREIGN PATENT DOCUMENTS

KR    1020100098826    9/2010

OTHER PUBLICATIONS

International Search Report & Written Opinion dated Feb. 11, 2020 for PCT Patent Application No. PCT/US2019/057154.

*Primary Examiner* — Danny Chan
(74) *Attorney, Agent, or Firm* — Schwabe, Williamson & Wyatt, P.C.

(57) ABSTRACT

Described is an apparatus and method to prevent a processor from abruptly shutting down by proactive power management. The apparatus comprises a power supply rail to receive a current and a voltage from a power supply generator (e.g., a DC-DC converter, and low dropout regulator); a processor coupled to the power supply rail, wherein the processor is to operate with a current and a voltage provided by the power supply rail; and an interface to receive a request to throttle one or more performance parameters of the processor when a monitored current through the power supply rail or a monitored voltage on the power supply rail crosses a threshold current or a threshold voltage, respectively, wherein the threshold current is below a catastrophic threshold current of a voltage regulator, or wherein the threshold voltage is above a catastrophic threshold voltage of the processor.

16 Claims, 12 Drawing Sheets

(51) Int. Cl.

| | | |
|---|---|---|
| *G06F 1/3206* | (2019.01) | |
| *H02M 3/158* | (2006.01) | |
| *H02M 1/08* | (2006.01) | |
| *G06F 1/20* | (2006.01) | |
| *G06F 1/3296* | (2019.01) | |
| *H02M 1/32* | (2007.01) | |
| *G06F 1/324* | (2019.01) | |
| *H02M 1/00* | (2006.01) | |
| *H02M 3/156* | (2006.01) | |

(52) U.S. Cl.
CPC ............ *H02M 1/32* (2013.01); *H02M 3/158* (2013.01); *G06F 1/324* (2013.01); *H02M 1/0009* (2021.05); *H02M 3/1566* (2021.05)

(56) References Cited

U.S. PATENT DOCUMENTS

| | | | | |
|---|---|---|---|---|
| 2002/0120882 | A1* | 8/2002 | Sarangi | G06F 1/24 713/600 |
| 2004/0000895 | A1* | 1/2004 | Solivan | H02M 3/156 323/271 |
| 2005/0057224 | A1* | 3/2005 | Naitoh | G06F 1/263 320/128 |
| 2007/0016815 | A1* | 1/2007 | Cooper | G06F 1/3203 713/322 |
| 2009/0044027 | A1* | 2/2009 | Piazza | G06F 1/3287 713/300 |
| 2009/0295349 | A1* | 12/2009 | Tao | H02M 3/33507 323/282 |
| 2010/0219687 | A1 | 9/2010 | Oh | |
| 2012/0066534 | A1* | 3/2012 | Dinsmoor | G06F 1/30 713/340 |
| 2012/0131395 | A1* | 5/2012 | Grobe | H04B 10/07953 714/704 |
| 2013/0024713 | A1* | 1/2013 | Bajic | G06F 1/3296 713/340 |
| 2014/0006833 | A1* | 1/2014 | Ma | G06F 1/26 713/340 |
| 2014/0173305 | A1* | 6/2014 | Uan-Zo-Li | G06F 1/3212 713/320 |
| 2014/0173312 | A1* | 6/2014 | Shippy | G06F 1/3293 713/323 |
| 2014/0181546 | A1* | 6/2014 | Hallberg | H02H 9/02 713/320 |
| 2014/0201550 | A1* | 7/2014 | Rusu | H03L 1/02 713/322 |
| 2015/0146328 | A1 | 5/2015 | Mikami et al. | |
| 2015/0244207 | A1 | 8/2015 | Narita | |
| 2016/0070335 | A1* | 3/2016 | Mitrea | G06F 1/3243 713/323 |
| 2016/0181921 | A1* | 6/2016 | Zhang | H02M 3/158 323/271 |
| 2016/0266603 | A1* | 9/2016 | Musunuri | G06F 1/08 |
| 2017/0126140 | A1 | 5/2017 | Yu et al. | |
| 2017/0329383 | A1 | 11/2017 | Bailey | |
| 2017/0331371 | A1* | 11/2017 | Parto | G05F 1/46 |
| 2017/0364132 | A1* | 12/2017 | Gendler | G06F 1/324 |
| 2018/0262108 | A1* | 9/2018 | Luo | G06F 1/26 |
| 2019/0146568 | A1* | 5/2019 | Bose | G06F 1/28 713/340 |
| 2019/0149058 | A1* | 5/2019 | Mao | H02H 7/1213 363/21.02 |
| 2019/0278731 | A1* | 9/2019 | Mattos | G06F 1/26 |
| 2019/0339992 | A1* | 11/2019 | Barnette | G06F 11/3058 |
| 2020/0201408 | A1* | 6/2020 | Lehwalder | G05B 23/0235 |
| 2020/0201736 | A1* | 6/2020 | Nishiyama | G06F 1/28 |

* cited by examiner

APPARATUS AND METHOD FOR PROACTIVE POWER MANAGEMENT TO AVOID UNINTENTIONAL PROCESSOR SHUTDOWN

BACKGROUND

Recently, process technology has hit the limit of Dennard scaling. To provide higher performance to a processor (e.g., a computer processing unit (CPU)), the power supply maximum current (IccMax) for the processor needs to also increase. Higher IccMax allows for faster execution speed at the cost of higher power consumption. However, currently customers desire to reduce the area of the printed circuit board (PCB) having the processor. This desire is in part to reduce size and weight of the PCB to provide mobility to the end users. Voltage regulators (VRs) are used to provide regulated power to the processor. Traditional VRs use large area to deliver higher IccMax, and hence performance, and this becomes a technical dilemma to resolve because providing higher performance while scaling down the size of the PCB is a challenge. In some applications, a processor may execute or run synthetic virus applications for an extended time which may reach 2× power consumption with respect to a real load limit. This may require the VR to supply higher than an application limited IccMax. Ideally, a VR is designed to supply IccMax to the processor to allow the processor to run real or normal applications instead of virus application(s). Designing a computer system that can allow a processor, manufactured in today's process technology, to run virus applications and real applications without causing catastrophic reliability failures is a challenge.

The background description provided herein is for the purpose of generally presenting the context of the disclosure. Unless otherwise indicated herein, the materials described in this section are not prior art to the claims in this application and are not admitted to be prior art by inclusion in this section.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1A:
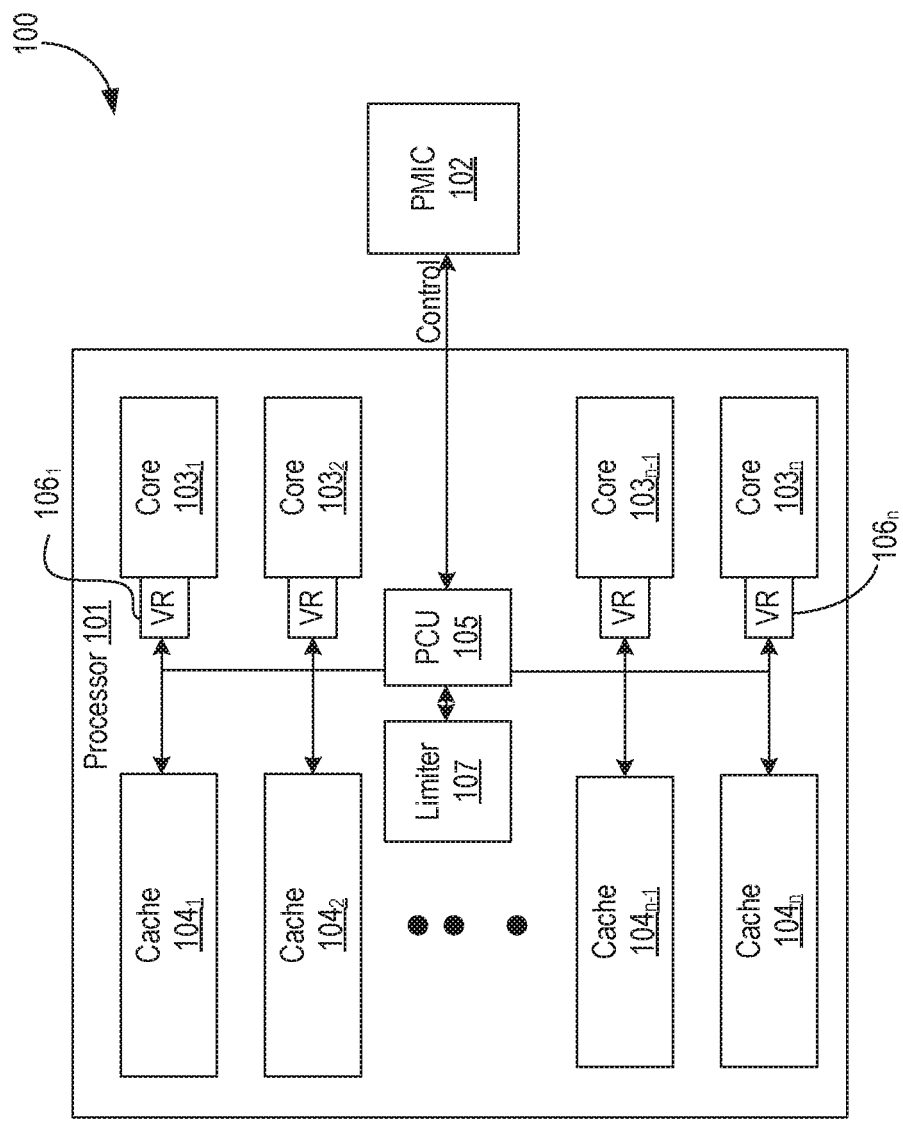
FIGS. 1A-B illustrate a part of a computing system having a processor with an apparatus for proactive power management to avoid processor shutdown, in accordance with some embodiments.

Some embodiments describe an apparatus for combined fast coordination of various mechanisms in a voltage regulator (VR) and a processor operation for effective and proactive power management. While the embodiments are described with reference to a buck DC-DC converter, the embodiments are not limited to such. Other forms of voltage generating circuitries such as low dropout (LDO) regulators, boost DC-DC converters, and the like can also be used in the overall system to proactively manage power of the processor and/or the entire computing system.

In some embodiments, a VR goes into cycle-by-cycle current limit, and provides a signal to the processor that enacts throttling in response to certain performance metrics exceeding predetermine (or programmable) thresholds. For example, when the current through a high-side switch of a VR increases a threshold current level between two VR switching cycles (or another number of cycles), then a power control unit (PCU) or any other suitable logic may instruct the processor to throttle its operating frequency. In one such embodiment, a divider ratio of a PLL (phase locked loop) is adjusted to reduce the operating frequency of the clock used by the processor without having the PLL lose phase lock. As such, fast throttling in the processor is executed with minimal latency when VR goes into current limit at real application level.

In some cases, the voltage on the power supply rail providing power to the processor droops when the processor (or load) current exceeds the level expected for executing a real application on the processor. In some embodiments, the apparatus monitors the voltage droop and when the voltage drops below a certain threshold, the PCU or any other suitable power management circuity may send a signal to the processor to throttle its operating frequency to reduce the load before the complete droop occurs. In some embodiments, the occurrence of the voltage droop or current spike is estimated based on execution of the real application on the processor. For example, speculative execution of certain instructions or other instruction in a pipeline can provide an indication that a voltage droop may occur and so the processor may want to throttle its frequency to avoid a possible shutdown of the VR and hence the processing system.

These signals from the PCU or power management circuitries to the processor are not merely alarm(s), but part of a mechanism that allows the VR to be designed for a low current rating. In some embodiments, when a large droop occurs, the decoupling capacitance or alternatively a clamp circuit support the voltage on the power supply rail during the time the load exceeds the VR voltage/current peak limit. As such, the VR can be designed to operate for real application power delivery while allowing short durations of processor peak power. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e g, immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device.

The term "between" may be employed in the context of the z-axis, x-axis or y-axis of a device. A device that is between two other devices may be directly connected to one or both of those devices, or it may be separated from both of the other two devices by one or more intervening devices.

Here, the term "backend" generally refers to a section of a die which is opposite of a "frontend" and where an IC (integrated circuit) package couples to IC die bumps. For example, high level metal layers (e.g., metal layer 6 and above in a ten-metal stack die) and corresponding vias that are closer to a die package are considered part of the backend of the die. Conversely, the term "frontend" generally refers to a section of the die that includes the active region (e.g., where transistors are fabricated) and low-level metal layers and corresponding vias that are closer to the active region (e.g., metal layer 5 and below in the ten-metal stack die example).

It is pointed out that those elements of the figures having the same reference numbers (or names) as the elements of any other figure can operate or function in any manner similar to that described, but are not limited to such.

FIG. 1A illustrates a part of a computing system 100 having a processor with apparatus for proactive power management, in accordance with some embodiments. In some embodiments, system 100 comprises processor 101 coupled to a power management integrated circuit (PMIC) 102. Processor 101 can be any processor that is used for running applications. For example, processor 101 can be a central processing unit (CPU), a system-on-chip (SOC), a digital signal processor (DSP), an application specific integrated circuit (ASIC), a multi-die processor (e.g., multiple dies connected to one another side-by-side and/or in a vertical stack), etc.

In some embodiments, PMIC 102 receives a voltage identification from processor 101 and provides an input power supply to processor 101. This input power supply is then used by various power generating circuits to generate controllable regulated power supplies. In some embodiments, PMIC 102 is integrated within processor 101.

In some embodiments, processor 101 comprises one or more processor cores. Here, N cores are shows as $103_{1-n}$, where 'n' is an integer. In some embodiments, each core is paired with a corresponding cache. For example, core $103_1$ is paired with cache $104_1$, core $103_2$ is paired with cache $104_2$, core $103_{n-1}$ is paired with cache $104_{n-1}$, and core $103_n$ is paired with cache $104_n$. In some embodiments, the cores $103_{1-n}$ are coupled to a shared cache (not shown). In various embodiments, each core is coupled to an associated power generator or regulator to provide controllable power to that core. In some embodiments, the entire processor 101 is powered by one or more power regulators instead of dedicated regulators per core. In some embodiments, major logic blocks such as cores, caches, I/Os, fuses, have their corresponding voltage regulators to control power to them.

In some embodiments, processor 101 comprises power control unit (PCU) 105 to manage power consumption of processor 101 under various operating conditions. For example, PCU 105 monitors temperature(s) of various parts of processor 101 and lowers operating voltage or frequency in response to rising temperature. In some embodiments, processor 101 comprises a limiter circuitry 107 that monitors various performance metrics (e.g., output current, output voltage, temperature, switching frequency, etc.) of the VRs and then issues one or more control signals to cause the VRs to change their behavior to avoid unintentional shutdown of processor 101. In some embodiments, the controls from limiter 107 are directly received by the VR(s) 106. For sake of not obscuring the embodiments, VR(s) $106_{1-n}$ are also referred to as VR 106 which may refer to one VR or many VRs together depending on the context of the sentence. In some embodiments, the controls from limiter 107 are processed by PCU 105 which then issues controls to the various VRs and other parts of processor 101.

In some embodiments, limiter 107 and/or PCU 105 reduces the design limits of VR(s) 106 to a threshold value of an application consumption, where the application is executed on one or more cores of processor 101. As such, limiter 107 ensures that the design limit of VR(s) 106 is not exceeded as the application executes. For example, limiter 107 may instruct the VR(s) to switch OFF a high-side FET (field effect transistor) of the VR 106 when current generated by the VR 106 is higher than a threshold current. One reason for the current to increase is a greater demand by the load of the VR 106. To prevent a catastrophic failure that may originate from an abrupt stopping of the supply current, two complementary measures are used in various embodiments. In some embodiments, one or more cores $104_{1-n}$ are throttled to reduce the power consumption or demand for a short duration. In some embodiments, an alternative power circuitry is used to support the above-threshold current demand.

The following example is illustrated with reference to VR $106_1$ and Core $103_1$, where VR is a switching-type buck DC-DC converter coupled to an inductor and load capacitor. However, the example is applicable to other VRs, cores, and other architectures where a VR is used to provide power to a processing unit. In some embodiments, limiting circuitry 107 detects the inductor current from VR $106_1$ has exceeded a pre-defined threshold level, and it limits the current through the inductor by turning off the high-side transistor of VR $106_1$. When the inductor current is limited, VR $106_1$ sends a fast throttling signal via limiter 107 (or PCU 105) to processor 101 to initiate the power consumption reduction. In some embodiments, an alternative power source (e.g., a higher voltage VR, existing on the platform) is used to supply an additional charge that is consumed by processor 101 from the moment the high-FET of VR 106 is turned OFF until the throttling happens using a voltage clamp circuit. As such, an output voltage of the VR $106_1$ dropping below a critically low level is avoided.

Figure 1B:
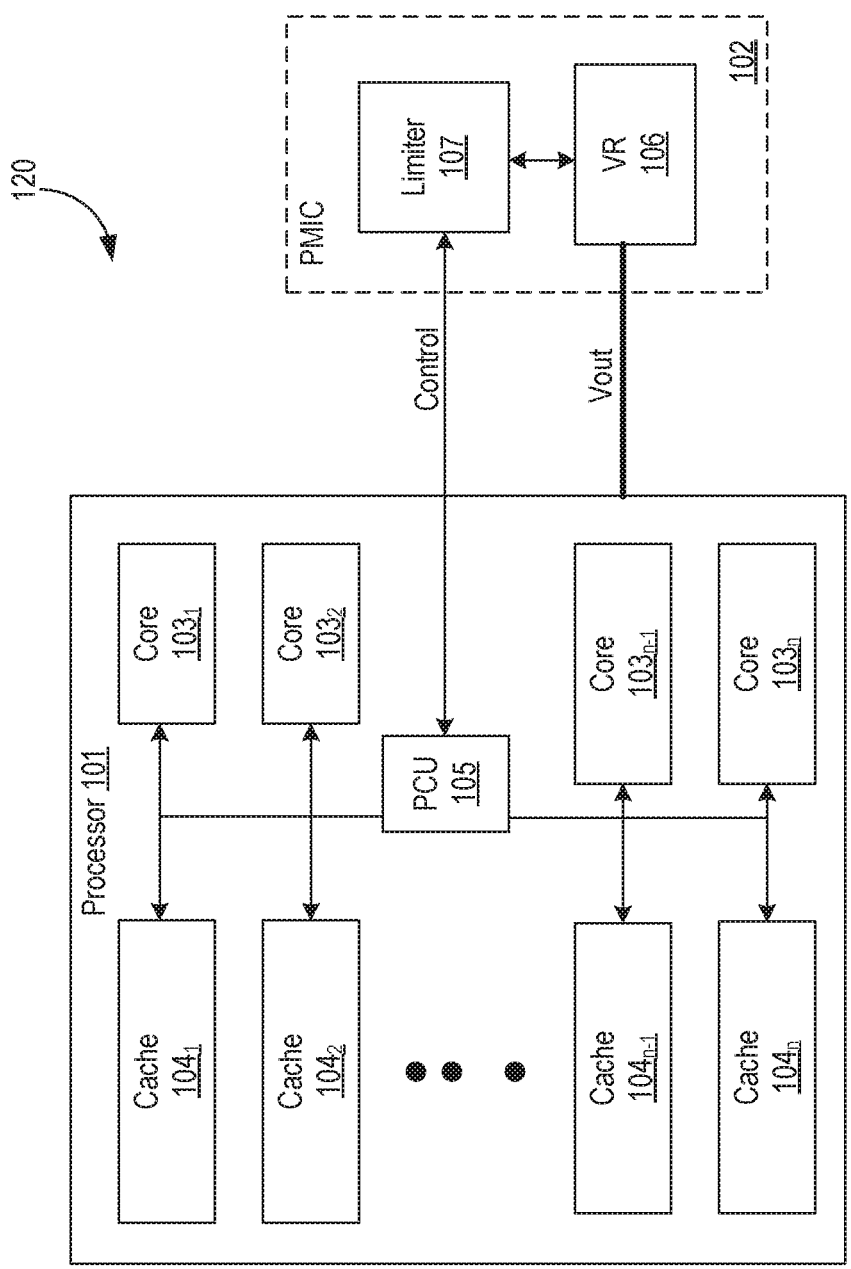

FIG. 1B illustrates architecture 120 where VR 106 is located external to processor 101 and provides power to the entire processor 101 through power supply rail Vout. In this example, limiter 107 is integrated in PMIC 102 along with VR 106. While the boundaries of various circuits are shown, these boundaries are just examples. For example, limiter 107 can be within the circuit boundary of VR 106. In another example, limiter 107 can be inside PCU 105. In one example, as shown in FIG. 1B, limiter 107 is part of PMIC 102 which also includes VR 106. In one such example, communication between limiter 107 and/or PCU 105 with VR 106 is via PMIC 102. Other locations of VR 106 are also contemplated. For example, processor 101 may have internal on-die VRs such as VRs $106_{1-n}$ and external VR 106.

Figure 2A:
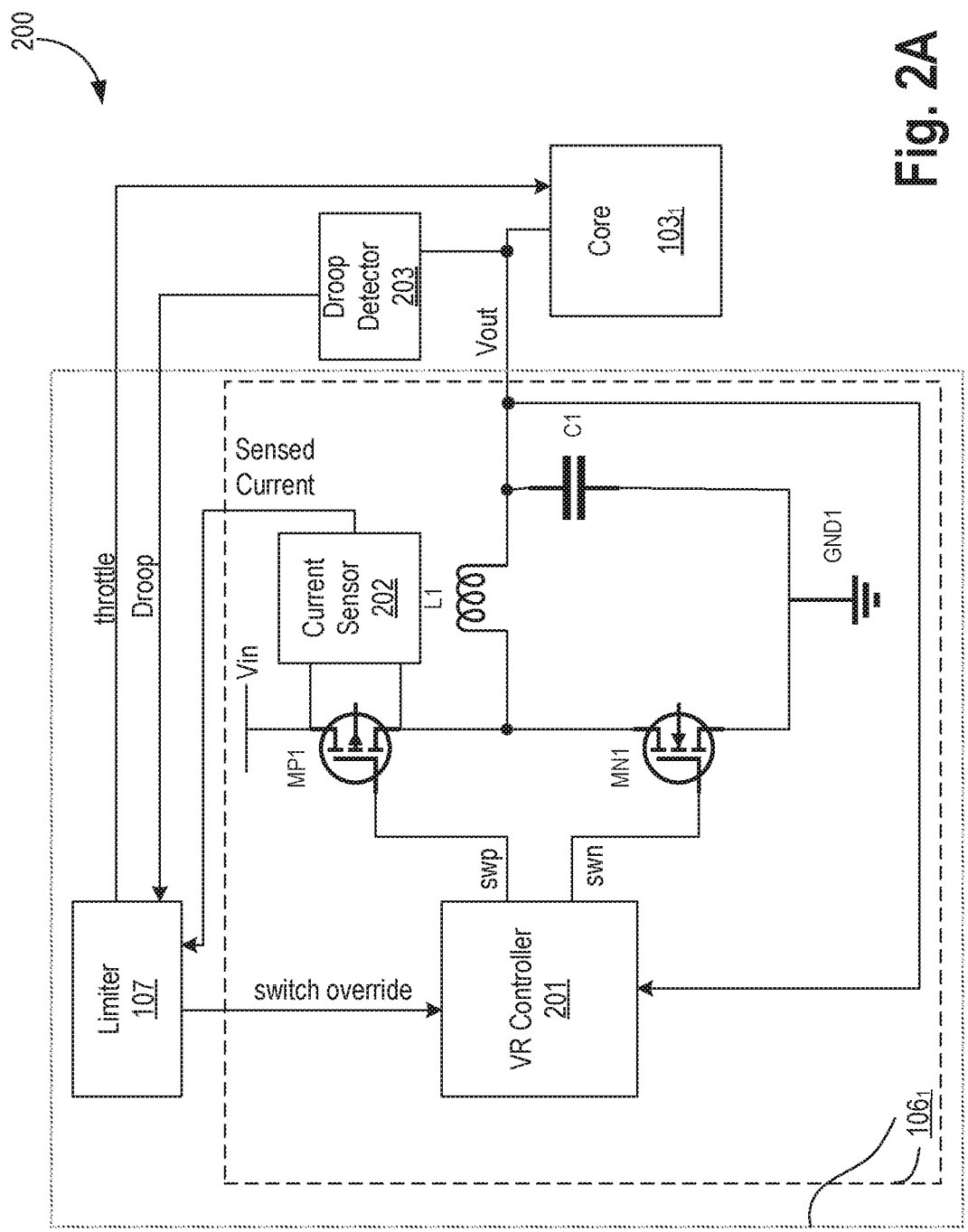
FIG. 2A illustrates a high-level architecture of the apparatus with a current sensor across a high-side switch, and a voltage droop detector used to proactively manage power of a processor, in accordance with some embodiments.

FIG. 2A illustrates a high-level architecture 200 of the apparatus with a current sensor across a high-side switch, and a voltage droop detector used to proactively manage power of a processor, in accordance with some embodiments. Architecture 200 comprises VR $106_1$ having VR Controller 201 and Current Sensor 202, high-side switch MP1, low-side switch MN1, inductor L1, capacitor C1, and power supply rail Vout. While the inductor L1, capacitor C1, and current sensor 202 are shown within the dotted boundary of VR $106_1$, any of these components can be within or outside the VR boundary. In some embodiments, architecture 200 further comprises a voltage droop detector 203 coupled to limiter 107 and core $103_1$. While Droop Detector 203 is illustrated outside of VR $106_1$ boundary and outside of Core $103_1$, Droop Detector 203 can be inside VR $106_1$ or inside Core $103_1$. Likewise, Limiter 107 can be part of VR $106_1$ instead of residing outside of VR $106_1$, in accordance with some embodiments.

In some embodiments, VR controller 201 comprises logic and circuitry to control the switching of low-side switch MN1 and high-side switch MP1 via switching signals swn and swp, respectively. VR controller 201 monitors the voltage on the power supply rail (or node) Vout and adjusts the duty cycle of a pulse width modulation (PWM) signal (not shown) that is used to generate the switching signals swn and swp. The duty cycle of the PWM signal is adjusted to allow Vout voltage to be at an expected level compared to a reference voltage.

In some embodiments, current sensor 202 is coupled to the high-side switch MP1 to sense and/or measure current through the high-side switch MP1. Here, the high-side switch MP1 is controlled by switching signal swp while the low-side switch MN1 is controlled by switching signal swn. In some embodiments, current sensor 202 measures or senses the instantaneous current of the buck converter high-side transistor MP1. Measuring the high-side transistor MP1 current (e.g., the drain current) would also measure the peak current of the inductor L1. This measured current (herein also referred to as IccMax) is then compared with a threshold current by limiter 107. When the measured current exceeds a level that would saturate the buck converter inductor L1 (herein, the current level that saturates L1 is referred to as IccMax), limiter 107 sends a switch override signal to VR controller 201 to cause the high-side transistor MP1 to be turned off. For example, swp signal is forced to be at Vin (or any other supply) level when switch override signal is asserted.

In some embodiments, Current Sensor 202 is implemented using transistor current mirror of the high-side transistor switch MP1. In some embodiments, VR Controller 201 is implemented by measuring the voltage drop across the high-side transistor switch MP1 when the high-side transistor switch MP1 is turned on.

Inductors can be made from magnetic material and are sized for IccMax/Nph (where Nph is a number of phases) to avoid saturation. When inductor saturation happens, the VR $106_1$ is at high risk of being damaged. In one example, inductor saturation is approximately 20 A for a low z-height inductor and about 30 A for a high z-height inductor. If the IccMax (under virus application scenario) is 60 A, 3 phases for low z-height and 2 phases for high z-height are needed. When the core IccMax increases, the number of phases would increase and this increases the size of the inductor and hence the cost of the computing system. To manage cost and to avoid turning off of the VR $106_1$, and hence the power supply to the processor core $103_1$, architecture 200 measures the current for the VR and turns off the high-side transistor switch MP1 when the current exceeds IccMax.

In one example, the high-side transistor switch MP1 is turned off for a short time (e.g., one or a few pulse with modulation cycles) while the processor core $103_1$ lowers its current draw requirement, and when that requirement is lowered (e.g., by throttling the frequency of the processor core $103_1$), the high-side transistor switch MP1 is turned back on in regular switching mode. In some embodiments, when the inductor L1 current reaches a current threshold (e.g., threshold of current that can be safely delivered by VR $106_1$), limiter 107 would send a throttle signal to processor core $103_1$ to force processor core $103_1$ to quickly reduce the current draw from Vout power supply rail.

This current threshold (IccMax) value represents the maximal processor consumption during execution of a worst case real application or thread. The IccMax value includes additional guard band taken to factor measurement inaccuracy, system delays and other factors that may impact the current estimation result. Turing off the high-side transistor switch MP1 forces the inductor current to ramp down, in accordance with some embodiments.

In some embodiments, architecture 200 comprises droop detector 203. When the load (here processor core $103_1$) suddenly draws a large current, the voltage Vout on the power supply rail will droop. Sometimes this droop is below a safe level and can cause logic of the processor core $103_1$ to malfunction. As a result, outputs of various logic circuits can be compromised. Further, a voltage droop on the output power supply rail Vout can cause the VR Controller 201 to cause the high-side switch MP1 to provide more current to inductor L and hence the processor core $103_1$ (load). This increase in current may cause VR $106_1$ to hit its maximum current limit IccMax.

In some embodiments, droop detector 203 compares the voltage on Vout to a predetermined (or programmable) threshold, and when the voltage on Vout crosses that threshold, droop detector 203 generates a Droop signal. The Droop signal (e.g., a logic 1 signal) is then processed by limiter 107 which may then directly or through PCU 102 request processor core $103_1$ to throttle (e.g., lower is operating frequency, postpone high energy or high power instructions, clock gate electrical paths not currently in use etc.).

For example, when processor core $103_1$ draws virus IccMax, depending on the size of the L1 and capacitor C1, and also the load step; either the inductor L1 would exceed IccMax of the VR $106_1$ or Vout would drop below a critically low level. When Vout is at the critically low level, limiter 107 needs to sends a throttling signal to processor core $103_1$ and/or take additional measure to control voltage Vout from falling.

Figure 2B:
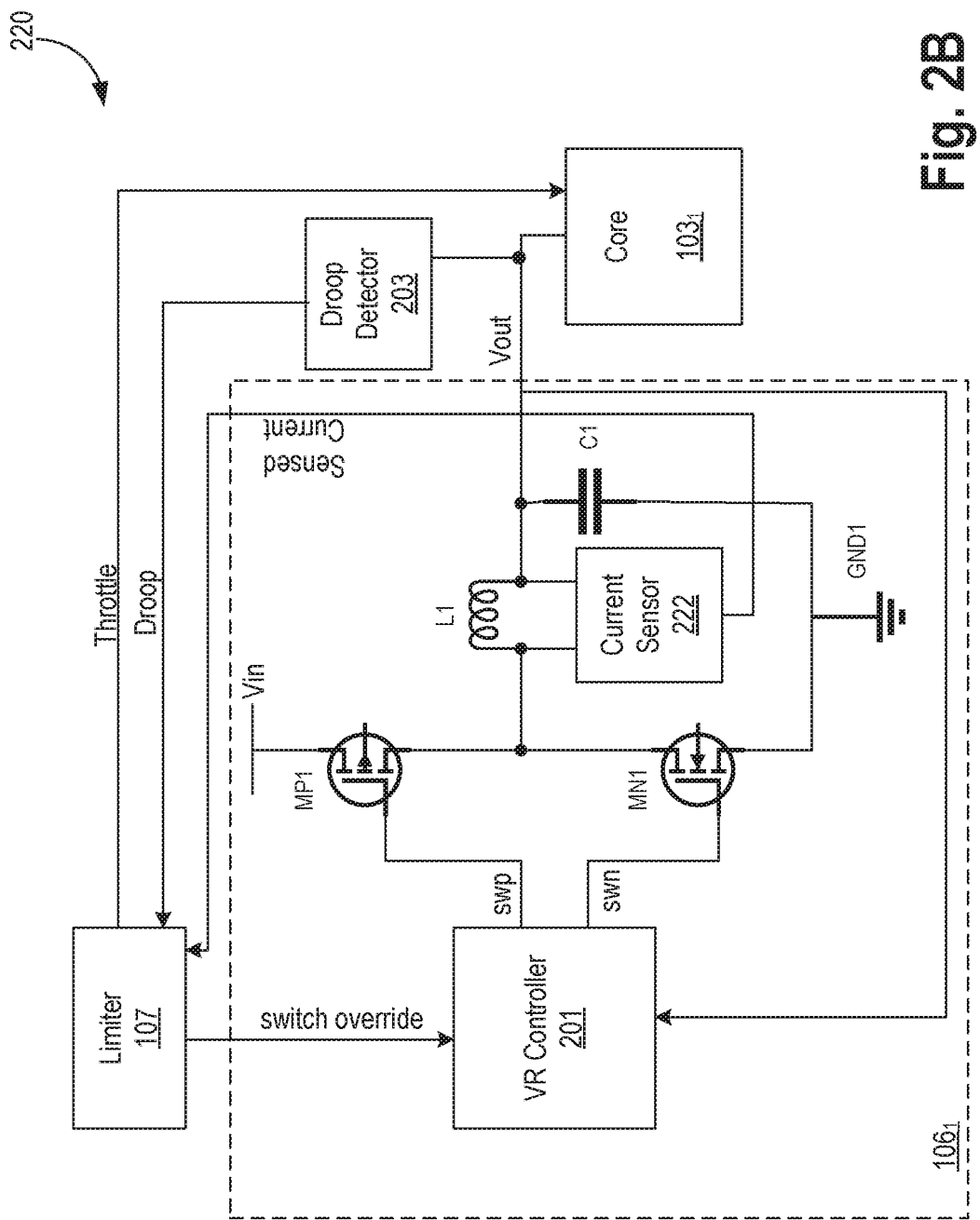
FIG. 2B illustrates a high-level architecture of the apparatus with a current sensor across an inductor, and a voltage droop detector used to proactively manage power of a processor, in accordance with some embodiments.

FIG. 2B illustrates a high-level architecture 220 of the apparatus with a current sensor across an inductor, and a voltage droop detector used to proactively manage power of a processor, in accordance with some embodiments. Compared to architecture 200, current sensor 202 is removed and current sensor 222 is added instead. In some embodiments, both current sensors 202 and 222 can be used. Current sensor 222 directly measures or senses the inductor current L1 instead of the drain current of the high-side transistor switch MP1. Functionally, architecture 220 operates similarly to architecture 200.

Figure 3A:
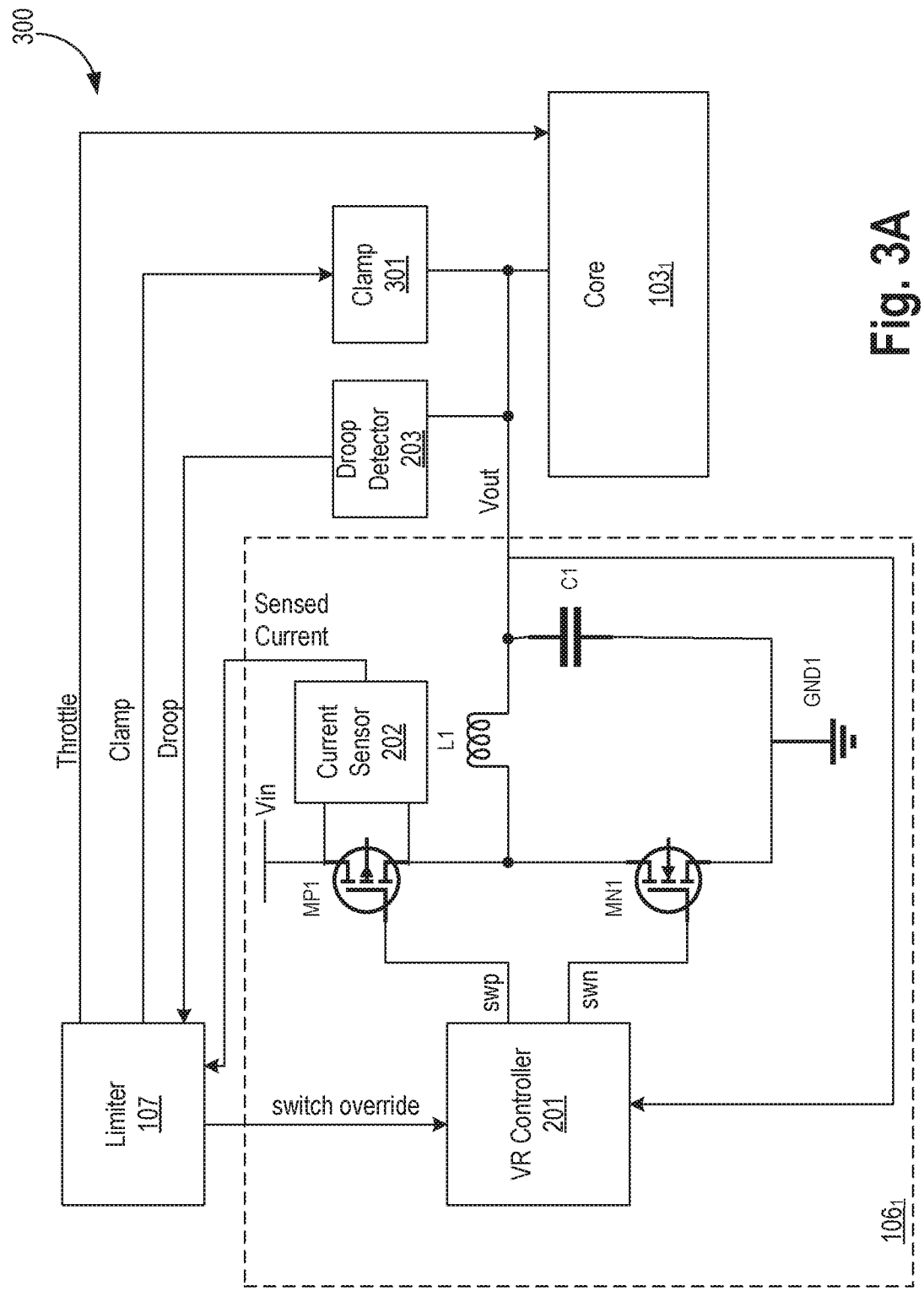
FIG. 3A illustrates a high-level architecture of the apparatus with a current sensor across a high-side switch, a voltage droop detector, and a clamp used to proactively manage power of a processor, in accordance with some embodiments.

FIG. 3A illustrates a high-level architecture 300 of the apparatus with a current sensor across a high-side transistor switch MP1, a voltage droop detector, 203 and a clamp 301 used to proactively manage power of a processor, in accordance with some embodiments. Architecture 300 is similar to architecture 200 but for the addition of clamp circuitry 301. As discussed with reference to FIG. 2A, when Droop detector 203 detects a droop on Vout that can cause IccMax violation of VR $106_1$ because VR $106_1$ may try to provide more current to compensate for the droop, Limiter 107 (and/or PCU 105) instructs clamp circuit 301 to clamp the voltage Vout of the power supply rail to a safe level. At the same time, processor core 103$i$ is instructed to throttle (e.g., lower its frequency, turn off certain logic units etc.) to reduce current draw demand from the power supply rail Vout. In some embodiments, the duration of enabling clamp 301 is the duration of the expected or actual droop on Vout power supply rail.

In some embodiments, clamp circuitry 301 includes a temperature sensor to sense the temperature of clamp 301. If the temperature is higher than a threshold temperature, then high-side transistor switch MP1 may be instructed to turn off to reduce the current draw by the load. In some embodiments, if the temperature is higher than a threshold temperature, the clamp 301 may be turned off. In some embodiments, clamp 301 is a high frequency switching buck converter or a switched capacitor step-down converter.

Once the droop is over, clamp 301 is turned off and VR $106_1$ operates as normal. In some embodiments, when clamp 301 is on, VR Controller 201 may switch off the high-side transistor switch MP1 to reduce the current supply to core $103_1$. In some embodiments, limiter 107 and/or PCU 105 sets the clamp turn off threshold level for clamp 301. This threshold level is the safe level to turn off the clamp circuitry 301. In some embodiments, the threshold level is higher than the droop detect level to add hysteresis in the clamp control. The presence of the clamp circuitry 301 can also reduce the size of the load capacitor C1.

Figure 3B:
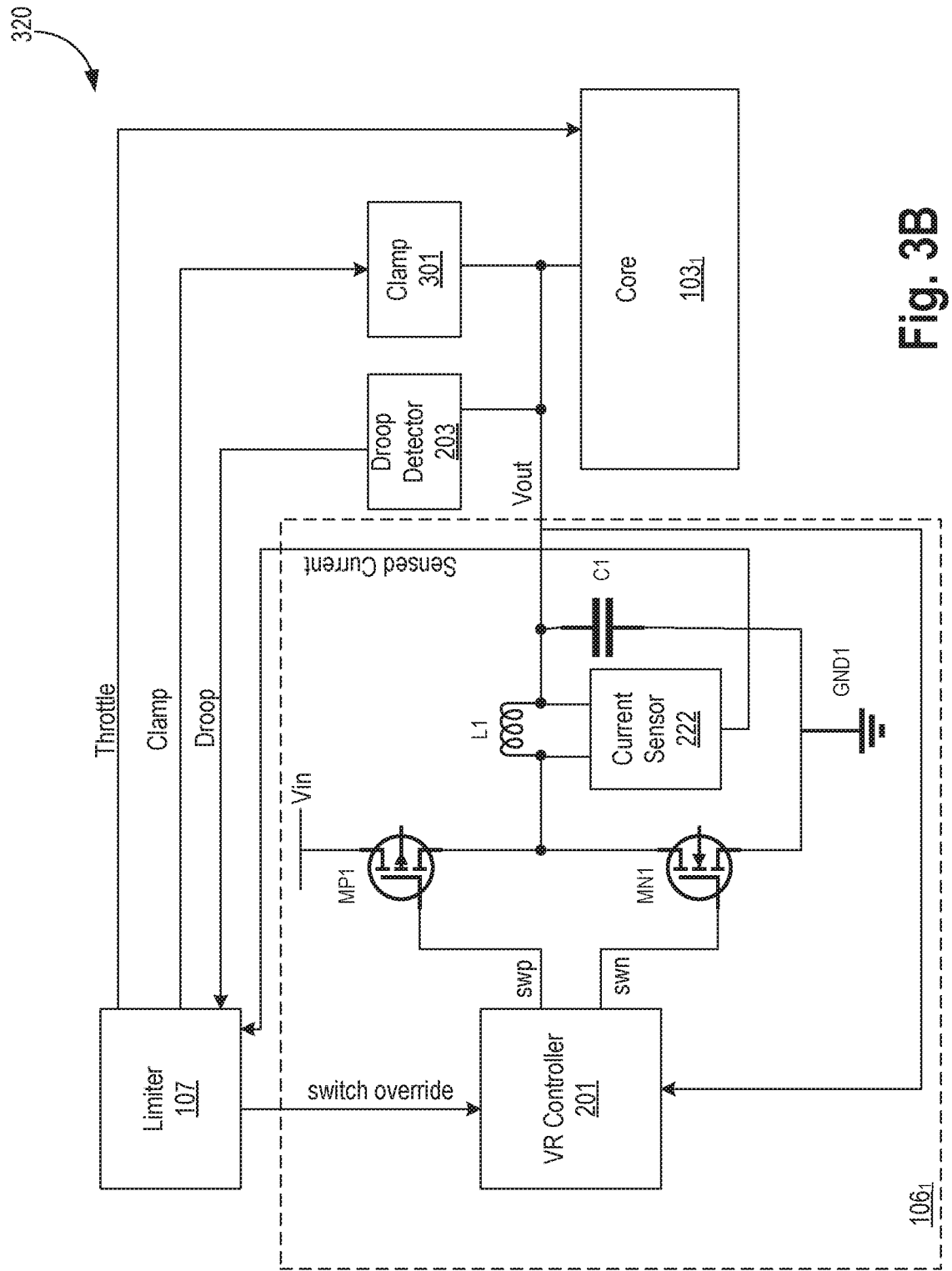
FIG. 3B illustrates a high-level architecture of the apparatus with a current sensor across an inductor, a voltage droop detector, and a clamp used to proactively manage power of a processor, in accordance with some embodiments.

FIG. 3B illustrates a high-level architecture 320 of the apparatus with a current sensor across an inductor, a voltage droop detector 203, and a clamp 301 used to proactively manage power of a processor, in accordance with some embodiments. Architecture 320 is similar to architecture 300 but for the addition of current sensor 222 to directly measure or sense the current through inductor L1.

Figure 4:
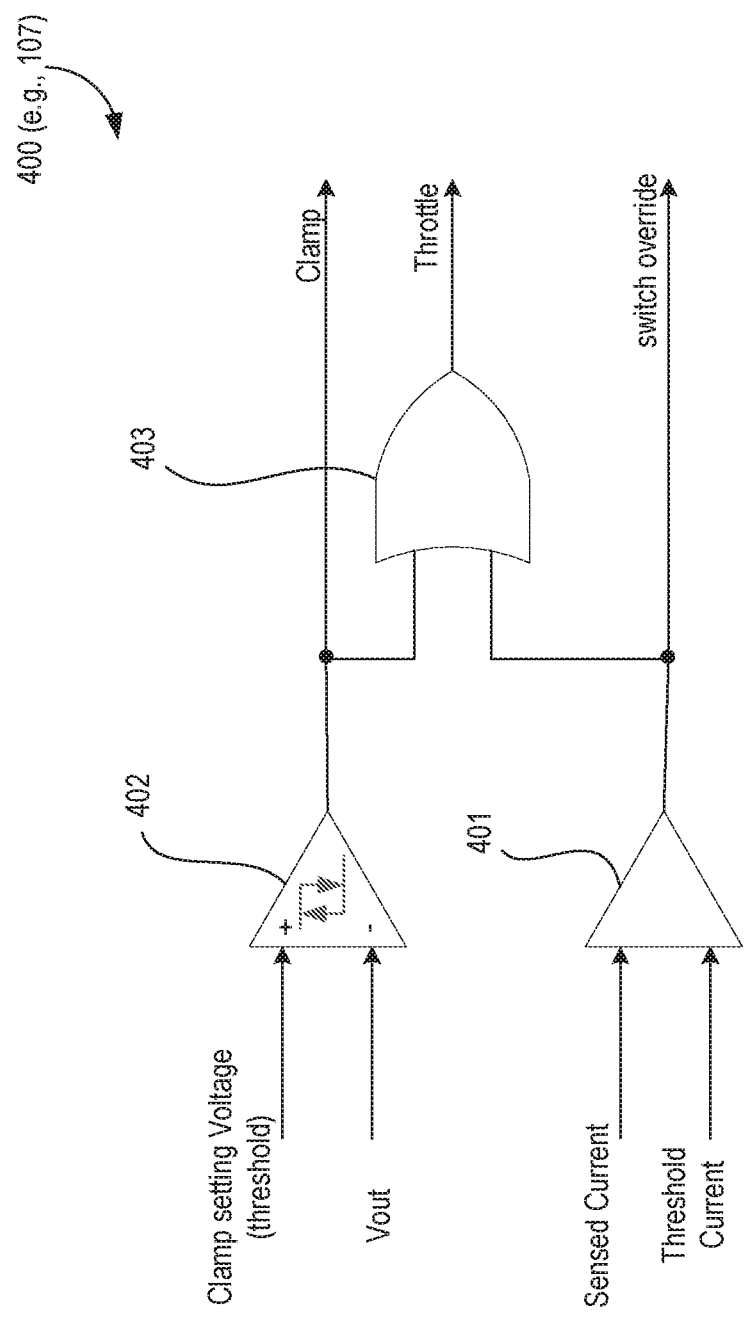
FIG. 4 illustrates an apparatus for generating control signals for proactively managing power of a processor, in accordance with some embodiments.

FIG. 4 illustrates apparatus 400 (e.g. limiter 107) for generating control signals for proactively managing power of a processor, in accordance with some embodiments. In some embodiments, apparatus 400 comprises first comparator 401, second comparator 402, and an OR logic gate 403. In some embodiments, first comparator 401 compares the VR output voltage (e.g., voltage Vout on the power supply rail Vout) with a clamp setting voltage or threshold. In some embodiments, first comparator 401 is removed and its function is replaced by droop detector 203. In some embodiments, first comparator 401 is a voltage comparator. Any suitable voltage comparator can be used to implement first or second comparators 402.

In some embodiments, second comparator 402 compares the sensed current with a threshold current. In some embodiments, second comparator 402 is a current comparator as opposed to a voltage comparator. The outputs of both first and second comparators (401 and 402, respectively) are voltage signals—clamp and switch override, respectively. In some embodiments, sensed current is converted into a voltage representation and compared against a threshold which represents a current threshold in voltage. The thresholds here can be programmed by software (e.g., BIOS or operating system, PCU 105, etc.) or by hardware (e.g., fuses, registers, external capacitors, resistors, etc.). In various embodiments, when limiter 400 indicates that clamp 301 needs to be turned on (e.g., when clamp is asserted) or when the inductor current or current through the high-side switch MP1 is higher than a threshold (e.g., switch override is asserted), the processor core $103_1$ (or the entire processor 101) is instructed to throttle.

In one example, Clamp signal, when asserted, causes Clamp circuitry 301 to clamp the power supply voltage to core $103_1$. Switch override signal, when asserted, causes the high-side switch MP1 to turn off. When either the clamp or the switch override signal is asserted, the processor 101 or the individual core associated with the VR $103_1$ is throttled. In some embodiments, when the processor 101 or the core $103_1$ is requested to throttle, it may adjust or modify a divider ratio of a PLL and lower the operating frequency of the processor 101 or the core $103_1$.

Figure 5:
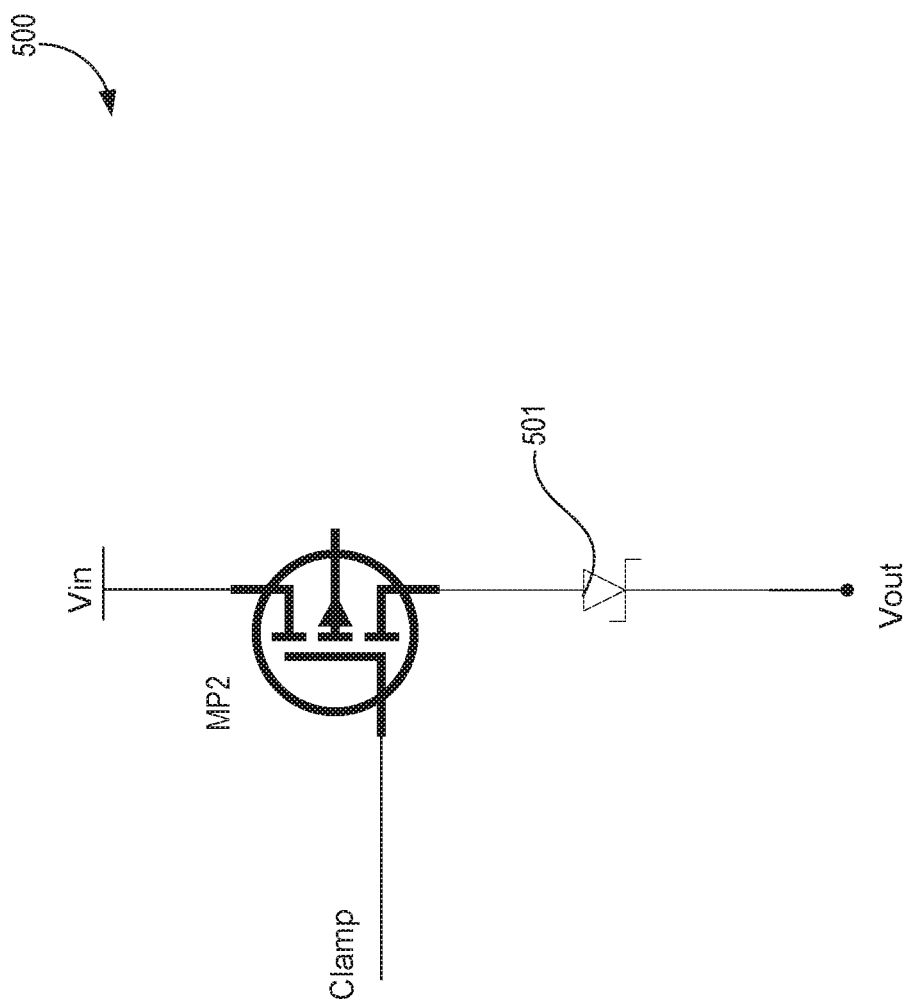
FIG. 5 illustrates an apparatus for clamping a voltage on a power supply rail coupled to the processor, in accordance with some embodiments.

FIG. 5 illustrates apparatus 500 for clamping a voltage on a power supply rail coupled to the processor, in accordance with some embodiments. In some embodiments, apparatus 500 comprises a p-type transistor MP2 to turn on or off the clamping function according to the logic level of the Clamp signal. In some embodiments, the p-type transistor MP2 is coupled in series with a diode 501 which adds voltage drop to ensure Vout is maintained at a required level to ensure correct clamping function. Apparatus 500 also behaves as a linear regular. When p-type transistor MP2 is on, the voltage on node Vout is determined by diode 501. In some embodiments, to endure that apparatus 500 does not run into thermal runaway situation, the duty cycle of the high-side switch MP2 is controlled by VR controller 201. High-side switch MP2 and diode 501 may dissipate significant power in the short duration the voltage on Vout is being clamped. This can lead to high temperature which further increases dissipation causing thermal runaway and eventual failure. Adjusting the duty cycle of the switching activity of high-side switch MP2 can protect from such thermal runaway. In some embodiments, when clamp 301 is enabled and turned on, processor 101 or core $103_1$ is instructed to lower its current draw requirements to ease the inductor current and thus the temperature of the clamp 301 (or apparatus 500).

Figure 6:
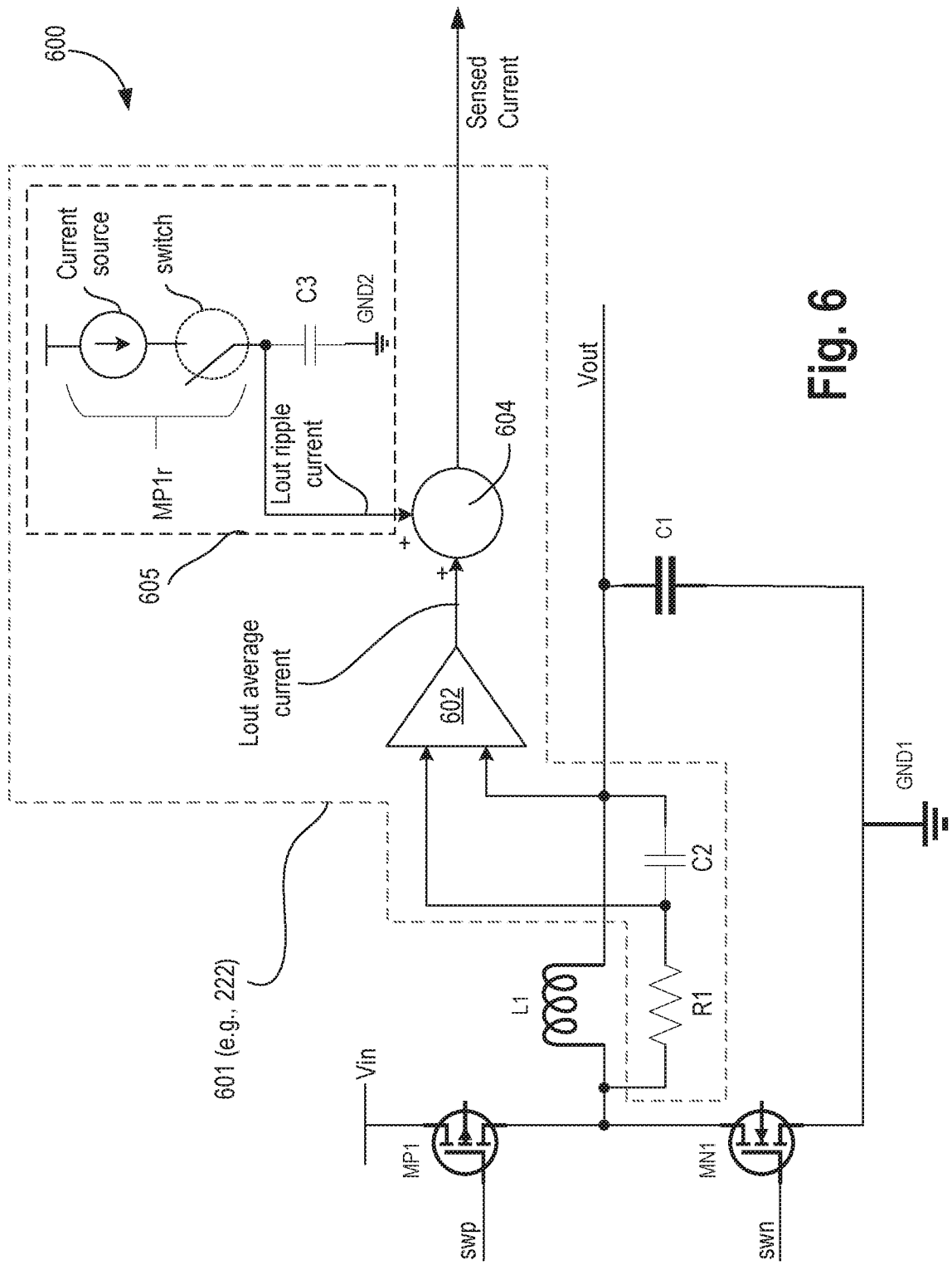
FIG. 6 illustrates an apparatus to sense or measure current through the inductor, in accordance with some embodiments.

FIG. 6 illustrates apparatus 600 to sense or measure current through the inductor, in accordance with some embodiments. In some embodiments, apparatus 600 comprises current sensor 601 (e.g., sensor 222 coupled to inductor L1). In some embodiments, current sensor 601 comprises resistor R1, capacitor C2, differential amplifier 602, summing node 604, and replica high-side switch 605. The replica high-side switch 605 comprises a transistor MP1r modeled as a current source and switch, and coupled to capacitor C3. The current through MP1r mimics the inductor ripple current. Here, the average current through inductor L1 is determined by the voltage difference seen across the two inputs of amplifier 602. These inputs provide the voltage difference across inductor L1. The peak current through inductor L1 is the average current flow through Vout power supply line plus the ramp current from the high-side switch MP1 (mimicked by MP1r). By combining these two currents at summing node 604, sensed current is achieved. In some embodiments, the current ripple of inductor L1 can be imitated in voltage ramp by supplying a constant current source to a capacitor when the replica high-side switch 605 is turned on. The sensed currents from different phases of the VR may be summed to determine the total VR current.

Figure 7:
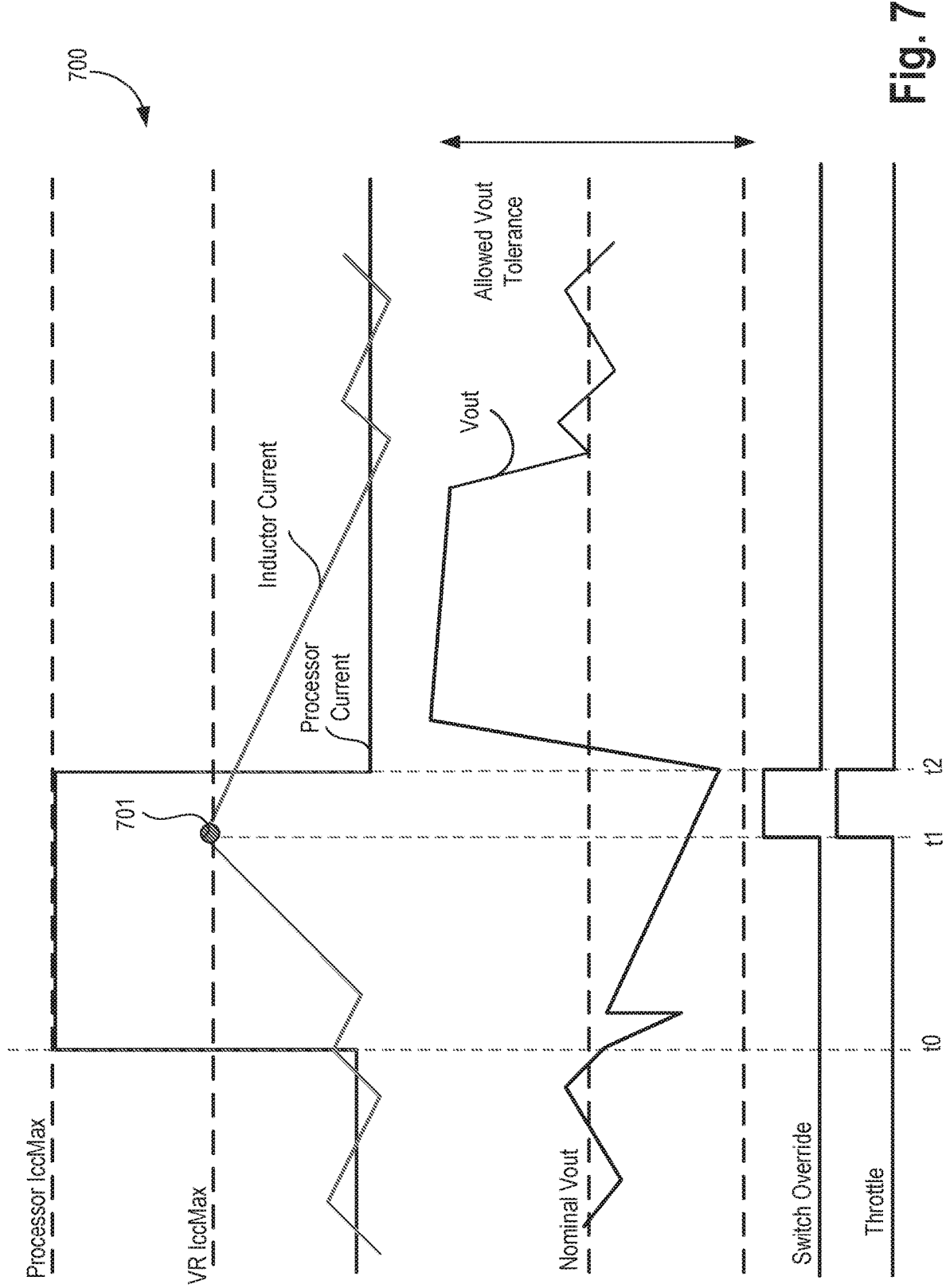
FIG. 7 illustrates a timing diagram and trainset response of the apparatus without voltage clamp and with sufficiently large load capacitance, in accordance with some embodiments.

FIG. 7 illustrates timing diagram 700 and transient response of the apparatus without voltage clamp and with sufficiently large load capacitance, in accordance with some embodiments. The horizontal dashed line indicate various thresholds. The top threshold is processor IccMax, above which the processor may exhibit reliability issues such as electro-migration. The second from the top threshold is VR IccMax which is the current limit supply of the VR $106_1$. The third threshold is the nominal Vout level.

At t0, the processor 101 or core $103_1$ begins to draw more current. At t1, processor or core $103_1$ is requested to throttle and reduce its current demand. Simultaneously, the VR high side switch MP1 is turned off by the switch override signal. As such, the inductor current begins to reduce after point 701. The processor or core $103_1$ current (e.g., current through Vout power supply rail) is reduced at t2, which allows the capacitor C1 to be charged back.

Figure 8:
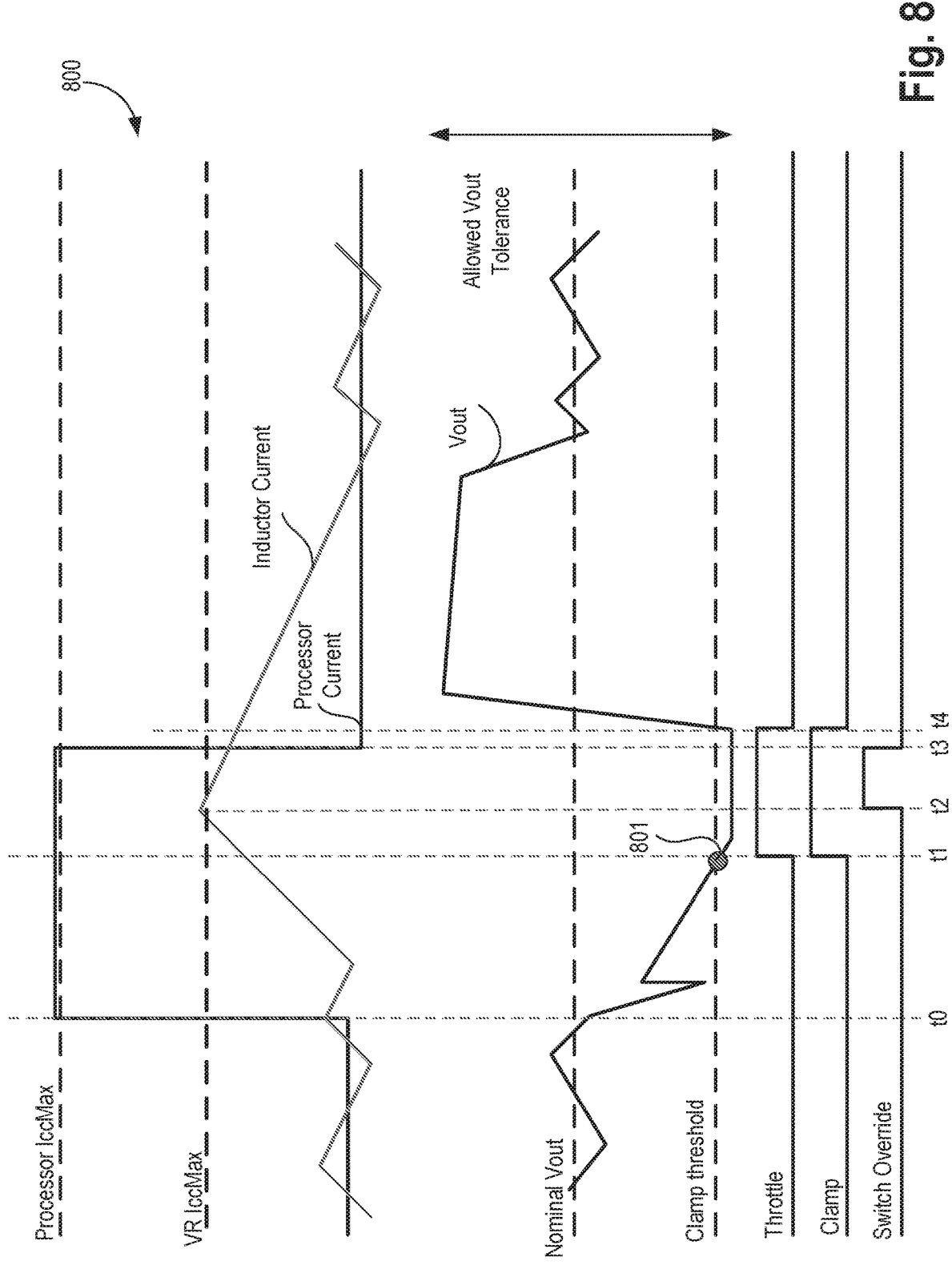
FIG. 8 illustrates a timing diagram and transient response of the apparatus with a voltage clamp and with relatively small load capacitance, in accordance with some embodiments.

FIG. 8 illustrates timing diagram 800 and transient response of the apparatus with a voltage clamp and with relatively small load capacitance, in accordance with some embodiments. The horizontal dashed lines are similar to the ones of timing diagram 700 in addition to clamp threshold being added. Here, due to smaller C1 as compared to C1 used for timing diagram 700, the voltage Vout drops to Vclamp (the critically low Vout level) sooner as indicated by point 801. The voltage clamp circuitry 301 starts at t1 and ends at t4. The inductor current begins to reduce at t2 after high-side switch MP1 is turned off by the switch override signal. The clamp circuit 301 starts supplying the current to avoid continuation of discharging of capacitor C1. Here, the processor starts throttling current at time t3 (why not at t1?), and Vout goes above threshold at time t4.

Figure 9:
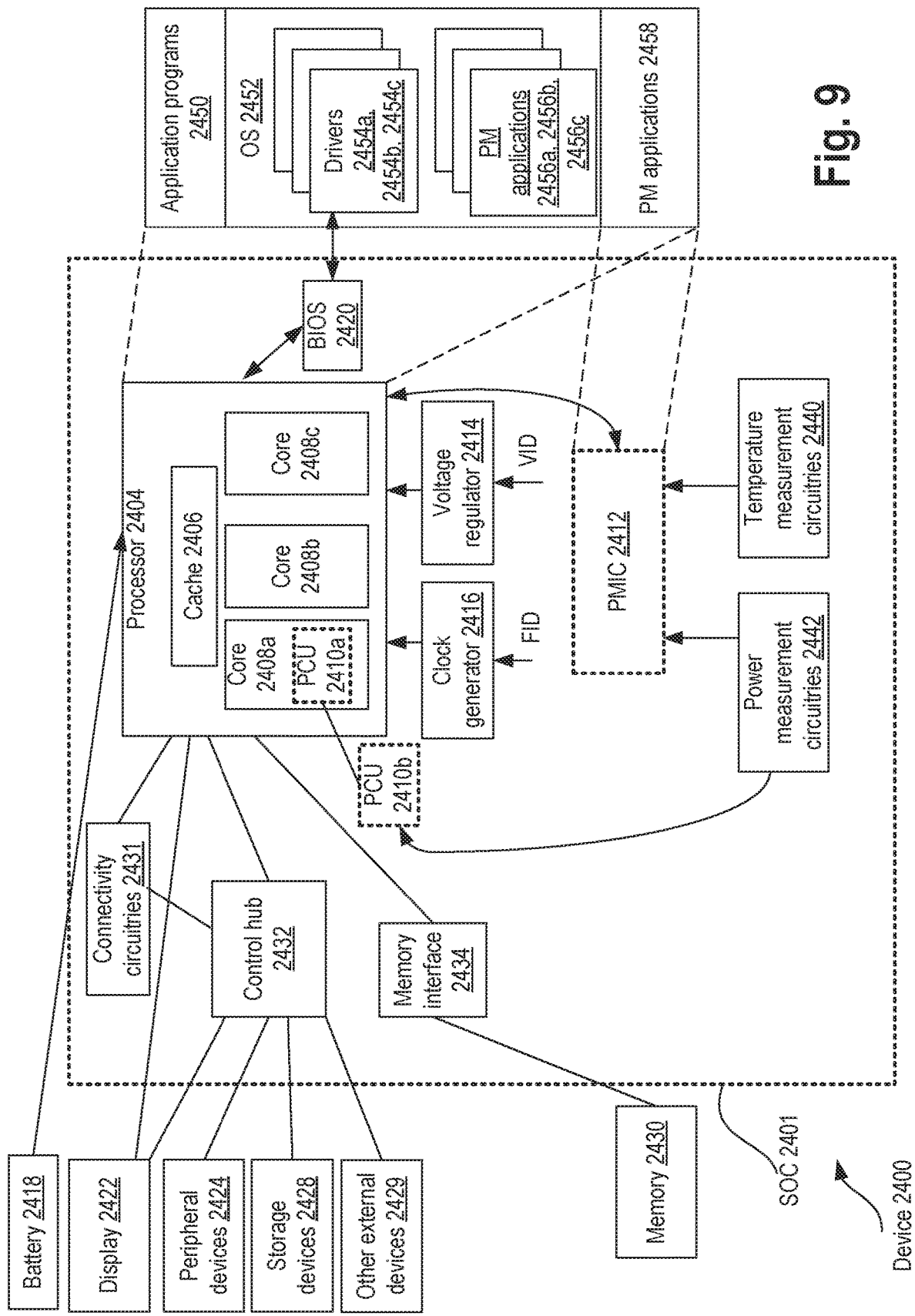
FIG. 9 illustrates a computing system with apparatus to proactively manage power of a processor, in accordance with some embodiments.

FIG. 9 illustrates a computing system 2400 with apparatus to proactively manage power of a processor, in accordance with some embodiments. In some embodiments, the device 2400 represents an appropriate computing device, such as a computing tablet, a mobile phone or smart-phone, a laptop, a desktop, an IOT device, a server, a wearable device, a set-top box, a wireless-enabled e-reader, or the like. It will be understood that certain components are shown generally, and not all components of such a device are shown in the device 2400.

In an example, the device 2400 comprises a SoC (System-on-Chip) 2401. An example boundary of the SOC 2401 is illustrated using dotted lines, with some example components being illustrated to be included within the SOC 2401—however, the SOC 2401 may include any appropriate components of the device 2400.

In some embodiments, the device 2400 includes a processor 2404. The processor 2404 can include one or more physical devices, such as microprocessors, application processors, microcontrollers, programmable logic devices, processing cores, or other processing means. The processing operations performed by processor 2404 include the execution of an operating platform or operating system on which applications and/or device functions are executed. The processing operations include operations related to I/O (input/output) with a human user or with other devices, operations related to power management, operations related to connecting the computing device 2400 to another device, and/or the like. The processing operations may also include operations related to audio I/O and/or display I/O.

In some embodiments, the processor 2404 includes multiple processing cores (also referred to as cores) 2408a, 2408b, 2408c. Although merely three cores 2408a, 2408b, 2408c are illustrated, the processor 2404 may include any other appropriate number of processing cores, e.g., tens, or even hundreds of processing cores. In some embodiments, the processor 2404 includes cache 2406. In an example, sections of the cache 2406 may be dedicated to individual cores 2408 (e.g., a first section of the cache 2406 dedicated to core 2408a, a second section of the cache 2406 dedicated to core 2408b, and so on). In an example, one or more sections of the cache 2406 may be shared among two or more of the cores 2408. The cache 2406 may be split in different levels, e.g., level 1 (L1) cache, level 2 (L2) cache, level 3 (L3) cache, etc.

In some embodiments, the device 2400 comprises connectivity circuitries 2431. For example, connectivity circuitries 2431 includes hardware devices (e.g., wireless and/or wired connectors and communication hardware) and/or software components (e.g., drivers, protocol stacks), e.g., to enable the device 2400 to communicate with external devices. The device 2400 may be separate from the external devices, such as other computing devices, wireless access points or base stations, etc.

In an example, connectivity circuitries 2431 may include multiple different types of connectivity. To generalize, the connectivity circuitries 2431 may include cellular connectivity circuitries, wireless connectivity circuitries, etc. Cellular connectivity circuitries of the connectivity circuitries 2431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2431 may include a network interface, such as a wired or wireless interface, e.g., so that a system embodiment may be incorporated into a wireless device, for example, cell phone or personal digital assistant.

In some embodiments, the device 2400 comprises a control hub 2432, which represents hardware devices and/or software components related to interaction with one or more I/O devices. For example, the processor 2404 may communicate with one or more of a display 2422, one or more peripheral devices 2424, storage devices 2428, one or more other external devices 2429, etc., via the control hub 2432. The control hub 2432 may be a chipset, a Platform Control Hub (PCH), and/or the like.

For example, the control hub 2432 illustrates one or more connection points for additional devices that connect to device 2400, e.g., through which a user might interact with the system. For example, devices (e.g., devices 2429) that can be attached to the device 2400 include microphone devices, speaker or stereo systems, audio devices, video systems or other display devices, keyboard or keypad devices, or other I/O devices for use with specific applications such as card readers or other devices.

As mentioned above, control hub 2432 can interact with audio devices, display 2422, etc. For example, input through a microphone or other audio device can provide input or commands for one or more applications or functions of the device 2400. Additionally, audio output can be provided instead of, or in addition to, display output. In another example, if the display 2422 includes a touch screen, the display 2422 also acts as an input device, which can be at least partially managed by the control hub 2432. There can also be additional buttons or switches on the computing device 2400 to provide I/O functions managed by the control hub 2432.

In one embodiment, control hub 2432 manages devices such as accelerometers, cameras, light sensors or other environmental sensors, or other hardware that can be included in the device 2400. The input can be part of direct user interaction, as well as providing environmental input to the system to influence its operations (such as filtering for noise, adjusting displays for brightness detection, applying a flash for a camera, or other features).

In some embodiments, the control hub 2432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, the display 2422 represents hardware (e.g., display devices) and software (e.g., drivers) components that provide a visual and/or tactile display for a user to interact with the device 2400. The display 2422 may include a display interface, a display screen, and/or hardware device used to provide a display to a user. In some embodiments, the display 2422 includes a touch screen (or touch pad) device that provides both output and input to a user. In an example, the display 2422 may communicate directly with the processor 2404. In some embodiments and although not illustrated in the figure, in addition to (or instead of) the processor 2404, the device 2400 may include Graphics Processing Unit (GPU) comprising one or more graphics processing cores, which may control one or more aspects of displaying contents on the display 2422.

The control hub 2432 may include hardware interfaces and connectors, as well as software components (e.g., drivers, protocol stacks) to make peripheral connections, e.g., to the peripheral devices 2424. It will be understood that the device 2400 could both be a peripheral device to other computing devices, as well as have peripheral devices connected to it. The device 2400 may have a "docking" connector to connect to other computing devices for purposes such as managing (e.g., downloading and/or uploading, changing, synchronizing) content on device 2400. Additionally, a docking connector can allow the device 2400 to connect to certain peripherals that allow the computing device 2400 to control content output, for example, to audiovisual or other systems.

In addition to a proprietary docking connector or other proprietary connection hardware, the device 2400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the connectivity circuitries 2431 may be coupled to the control hub 2432, e.g., in addition to, or instead of, being coupled directly to the processor 2404. In some embodiments, the display 2422 may be coupled to the control hub 2432, e.g., in addition to, or instead of, being coupled directly to the processor 2404.

In some embodiments, the device 2400 comprises a memory 2430 coupled to the processor 2404 via a memory interface 2434. The memory 2430 includes memory devices for storing information in the device 2400. Memory can include nonvolatile (state does not change if power to the memory device is interrupted) and/or volatile (state is indeterminate if power to the memory device is interrupted) memory devices. Memory 2430 can store application data, user data, music, photos, documents, or other data, as well as system data (whether long-term or temporary) related to the execution of the applications and functions of the device 2400.

Elements of various embodiments and examples are also provided as a machine-readable medium (e.g., memory 2430) for storing the computer-executable instructions (e.g., instructions to implement any other processes discussed herein). The machine-readable medium (e.g., memory 2430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, the device 2400 comprises temperature measurement circuitries 2440, e.g., for measuring temperature of various components of the device 2400. In an example, the temperature measurement circuitries 2440 may be embedded, or coupled or attached to various components, whose temperatures are to be measured and monitored. For example, the temperature measurement circuitries 2440 may measure temperature of (or within) one or more of the cores 2408a, 2408b, 2408c, a voltage regulator 2414, the memory 2430, a mother-board of the SOC 2401, and/or any appropriate component of the device 2400.

In some embodiments, the device 2400 comprises power measurement circuitries 2442, e.g., for measuring power consumed by one or more components of the device 2400. In an example, in addition to, or instead of, measuring power, the power measurement circuitries 2442 may measure voltage and/or current. In an example, the power measurement circuitries 2442 may be embedded, or coupled or attached to various components, whose power, voltage, and/or current consumption are to be measured and monitored. For example, the power measurement circuitries 2442 may measure power, current and/or voltage supplied by one or more voltage regulators 2414, power supplied to the SOC 2401, power supplied to the device 2400, power consumed by the processor 2404 (or any other component) of the device 2400, etc.

In some embodiments, the device 2400 comprises one or more voltage regulator circuitries, generally referred to as voltage regulator (VR) 2414. The VR 2414 generates signals at appropriate voltage levels, which may be supplied to operate any appropriate components of the device 2400. Merely as an example, the VR 2414 is illustrated to be supplying signals to the processor 2404 of the device 2400. In some embodiments, the VR 2414 receives one or more Voltage Identification (VID) signals, and generates the voltage signal at an appropriate level, based on the VID signals.

In some embodiments, the device 2400 comprises one or more clock generator circuitries, generally referred to as clock generator 2416. The clock generator 2416 generates clock signals at appropriate frequency levels, which may be supplied to any appropriate components of the device 2400. Merely as an example, the clock generator 2416 is illustrated to be supplying clock signals to the processor 2404 of the device 2400. In some embodiments, the clock generator 2416 receives one or more Frequency Identification (FID) signals, and generates the clock signals at an appropriate frequency, based on the FID signals.

In some embodiments, the device 2400 comprises a battery 2418 supplying power to various components of the device 2400. Merely as an example, the battery 2418 is illustrated to be supplying power to the processor 2404. Although not illustrated in the figures, the device 2400 may comprise a charging circuitry, e.g., to recharge the battery, based on Alternating Current (AC) power supply received from an AC adapter.

In some embodiments, the device 2400 comprises a Power Control Unit (PCU) 2410 (also referred to as Power Management Unit (PMU), Power Controller, etc.). In an example, some sections of the PCU 2410 may be implemented by one or more processing cores 2408, and these sections of the PCU 2410 are symbolically illustrated using a dotted box and labelled as PCU 2410a. In an example, some other sections of the PCU 2410 may be implemented outside the processing cores 2408, and these sections of the PCU 2410 are symbolically illustrated using a dotted box and labelled as PCU 2410b. The PCU 2410 may implement various power management operations for the device 2400. The PCU 2410 may include hardware interfaces, hardware circuitries, connectors, registers, etc., as well as software components (e.g., drivers, protocol stacks), to implement various power management operations for the device 2400.

In some embodiments, the device 2400 comprises a Power Management Integrated Circuit (PMIC) 2412 (e.g., 102), e.g., to implement various power management operations for the device 2400. In an example, the PMIC is within an IC chip separate from the processor 2404. This may implement various power management operations for the device 2400. The PMIC 2412 may include hardware interfaces, hardware circuitries, connectors, registers, etc., as well as software components (e.g., drivers, protocol stacks), to implement various power management operations for the device 2400.

In an example, the device 2400 comprises one or both the PCU 2410 (e.g., 105) or the PMIC 2412. In an example, any one of the PCU 2410 or the PMIC 2412 may be absent in the device 2400, and hence, these components are illustrated using dotted lines.

Various power management operations of the device 2400 may be performed by the PCU 2410, by the PMIC 2412, or by a combination of the PCU 2410 and PMIC 2412. For example, the PCU 2410 and/or PMIC 2412 may select a power state (e.g., P-state) for various components of the device 2400. For example, the PCU 2410 and/or PMIC 2412 may select a power state (e.g., in accordance with the ACPI (Advanced Configuration and Power Interface) specification) for various components of the device 2400. Merely as an example, the PCU 2410 and/or PMIC 2412 may cause various components of the device 2400 to transition to a sleep state, to an active state, to an appropriate C state (e.g., C0 state, or another appropriate C state, in accordance with the ACPI specification), etc. In an example, the PCU 2410 and/or PMIC 2412 may control a voltage output by the VR 2414 and/or a frequency of a clock signal output by the clock generator, e.g., by outputting the VID signal and/or the FID signal, respectively. In an example, the PCU 2410 and/or PMIC 2412 may control battery power usage, charging of the battery 2418, and features related to power saving operation.

In an example, the PCU 2410 and/or PMIC 2412 may perform power management operations, e.g., based at least in part on receiving measurements from the power measurement circuitries 2442, temperature measurement circuitries 2440, charge level of the battery 2418, and/or any other appropriate information that may be used for power management.

Also illustrated is an example software stack of the device 2400 (although not all elements of the software stack are illustrated). Merely as an example, the processors 2404 may execute application programs 2450, an Operating System 2452, one or more Power Management (PM) specific application programs (e.g., generically referred to as PM applications 2458), and/or the like. The PM applications 2458 may also be executed by the PCU 2410 and/or PMIC 2412. The OS 2452 may also include one or more PM applications 2456a, 2456b, 2456c. The OS 2452 may also include various drivers 2454a, 2454b, 2454c, etc., some of which may be specific for power management purposes. In some embodiments, the device 2400 may further comprise a Basic Input/Output System (BIOS) 2420. The BIOS 2420 may communicate with the OS 2452 (e.g., via one or more drivers 2454), communicate with the processor 2404, etc.

For example, one or more of the PM applications 2458, 2456, drivers 2454, BIOS 2420, etc. may be used to implement power management specific tasks, e.g., to control voltage and/or frequency of various components of the device 2400, to control wake-up state, sleep state, and/or any other appropriate power state of various components of the device 2400, control battery power usage, charging of the battery 2418, features related to power saving operation, etc.

In some embodiments, voltage regulator 2414 has the feature of VR 106. In some embodiments, the apparatus for combined fast coordination of various mechanisms in VR 2414 and processor operation for effective and proactive power management. While the embodiments are described with reference to a buck DC-DC converter for VR 2414, the embodiments are not limited to such. Other forms of voltage generating circuitries such as low dropout (LDO) regulators, boost DC-DC converter, etc. can also be used in the overall system to proactively manage power of the processor and/or the entire computing system.

In some embodiments, VR 2414 goes into cycle-by-cycle current limit, and provides a signal to the processor that enacts throttling in response to certain performance metrics exceeding predetermined (or programmable) thresholds. For example, when the current through a high-side switch of VR 2414 increases a threshold current level between two VR switching cycles (or another number of cycles), then a PCU 2410b or any other suitable logic may instruct the processor to throttle its operating frequency. In one such embodiment, a divider ratio of a PLL (phase locked loop) is adjusted to reduce the operating frequency of the clock used by the processor without having the PLL lose phase lock. As such, fast throttling in the processor is executed with minimal latency when VR goes into current limit at real application level.

In some cases, the voltage on the power supply rail Vout providing power to the processor droops when the processor (or load) current exceeds the level expected for real application. In some embodiments, the apparatus monitors the droop and when the voltage drops below a certain threshold, PCU 2410b or any other suitable power management circuitry may send a signal to the processor to throttle its operating frequency to reduce the load before the complete droop occurs. In some embodiments, the occurrence of the voltage droop or current spike is estimated based on execution of the real application on the processor 2404. For example, speculative execution of certain instructions or other instruction in a pipeline can provide an indication that a voltage droop may occur and so the processor may want to throttle its frequency to avoid a possible shutdown of the VR and hence the processing system.

These signals from PCU 2410b or power management circuitries to the processor are not alarm(s), but part of a mechanism that allows VR 2414 to be designed for a low current rating. In some embodiments, when a large droop occurs the decoupling capacitance or alternatively a clamp circuit support the voltage on the power supply rail during the time the load exceeds the VR voltage/current peak limit. As such, VR 2414 can be designed to operate for real application power delivery while allowing short durations of processor peak power.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

Following examples are provided to illustrate the various embodiments. These examples can depend from one another in any suitable manner.

Example 1

An apparatus comprising: a power supply generator (e.g., VR $106_1$) to provide current and voltage to a power supply rail (e.g., rail Vout); a processor core (e.g., $103_1$) coupled to the power supply rail, the processor core to operate with the current and voltage provided by the power supply generator; a first circuitry (e.g., sensor 202 or 222) to monitor the current provided by power supply generator; and a second circuitry (e.g., limiter 107 or VR controller 201) to at least partially turn off the power supply generator when the monitored current crosses a threshold current (e.g., IccMax threshold).

Example 2

The apparatus of example 1 further comprising: a third circuitry (e.g., PCU 105 or limiter 107) to request the processor core to reduce a current draw from the power supply rail when the second circuitry determines that the monitored current crossed the threshold current.

Example 3

The apparatus of example 2 further comprising: a fourth circuitry (e.g., droop detector 203) to monitor the voltage on the power supply rail, wherein the third circuitry is to request processor core to reduce one or more performance parameters when the fourth circuitry determines that the monitored voltage crossed a threshold voltage.

Example 4

The apparatus of example 3, wherein the one or more performance parameters include: an operating frequency, fan speed, current draw, and divider ratio.

Example 5

The apparatus of example 3 further comprising a clamp circuitry (e.g., circuitry 301) to clamp the voltage on the power supply rail to a predetermined voltage level when the fourth circuitry determines that the monitored voltage crossed a threshold voltage.

Example 6

The apparatus of example 1, wherein the power supply generator comprises a high-side switch (e.g., MP1) and a low-side switch (e.g., MN1), wherein the high-side switch is coupled in series with the low-side switch, and wherein the high-side switch is turned off (e.g., using switch override) by the second circuitry when the monitored current crosses the threshold current.

Example 7

The apparatus of example 6, wherein the second circuitry is to turn off the high-side switch for a duration of an expected voltage droop on the power supply rail.

Example 8

The apparatus of example 6, wherein the second circuitry is to turn off the high-side switch for a duration of a voltage droop on the power supply rail, and is to turn on the high-side switch when the voltage droop substantially ends.

Example 9

The apparatus of example 1, wherein the power supply generator is one of: a DC-DC converter, a buck converter, a boost converter, a low dropout (LDO) regulator, a switched capacitor voltage regulator, or a bi-directional DC-DC converter.

Example 10

An apparatus comprising: a power supply rail (e.g., Vout) to receive a current and a voltage from a power supply generator; a processor coupled to the power supply rail, wherein the processor (e.g., 101) is to operate with a current and a voltage provided by the power supply rail; and an interface (input of processor core $103_1$) to receive a request to throttle one or more performance parameters of the processor when a monitored current through the power supply rail or a monitored voltage on the power supply rail crosses a threshold current or a threshold voltage, respectively, wherein the threshold current is below a catastrophic threshold current of the VR, or wherein the threshold voltage is above a catastrophic threshold voltage of the processor.

Example 11

The apparatus of example 10, wherein the one or more performance parameters include: an operating frequency, fan speed, current draw, and phase lock loop (PLL) divider ratio.

Example 12

The apparatus of example 10 further comprises a clamp circuitry to clamp the voltage on the power supply rail to a predetermined voltage level when the monitored voltage crosses the threshold voltage.

Example 13

The apparatus of example 10, wherein the power supply generator comprises a high-side switch and a low-side switch, wherein the high-side switch is coupled in series with the low-side switch, and wherein the high-side switch is turned off when the monitored current crosses the threshold current.

Example 14

The apparatus of example 10, wherein the power supply generator comprises a high-side switch and a low-side switch, wherein the high-side switch is coupled in series with the low-side switch, and wherein the high-side switch is turned off for a duration of an expected voltage droop on the power supply rail.

Example 15

The apparatus of example 10, wherein the power supply generator comprises a high-side switch and a low-side switch, wherein the high-side switch is coupled in series with the low-side switch, and wherein the high-side switch is turned off for a duration of a voltage droop on the power supply rail, and wherein the high-side switch is turned back on when the voltage droop substantially ends.

Example 16

The apparatus of example 10, wherein the power supply generator is one of: a DC-DC converter, a buck converter, a boost converter, a low dropout (LDO) regulator, a switched capacitor voltage regulator, or a bi-directional DC-DC converter.

Example 17

A system comprising: a DC-DC converter coupled to an inductor and a capacitor; a processor coupled to the DC-DC converter, the processor comprising: a power supply rail coupled to the inductor and the capacitor; and a processor core coupled to the power supply rail, wherein the processor core is to operate with a current and a voltage provided by the DC-DC converter; wherein the DC-DC converter comprises: a first circuitry to monitor current, through the inductor, which is provided as the current to the power supply rail; and a second circuitry to turn off a high-side switch of the DC-DC converter when the monitored current crosses a threshold current; and an interface to allow the processor to communicate with another device.

Example 18

The system of example 17, wherein the processor comprises a clamp circuitry to clamp the voltage on the power supply rail to a predetermined voltage level when a monitored voltage of the power supply rail crosses the threshold voltage.

Example 19

The system of example 17 comprises a third circuitry to send a request to the processor to throttle one or more performance parameters of the processor when a monitored current through the power supply rail or a monitored voltage on the power supply rail crosses a threshold current or a threshold voltage, respectively, wherein the threshold current is below a catastrophic threshold current of the VR, or wherein the threshold voltage is above a catastrophic threshold voltage of the processor.

Example 20

The system of example 19, wherein the one or more performance parameters include: an operating frequency, fan speed, current draw, and phase lock loop (PLL) divider ratio.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
    a power supply generator to provide current and voltage to a power supply rail;
    a processor core coupled to the power supply rail, the processor core to operate with the current and voltage provided by the power supply generator;
    circuitry to monitor the current provided by the power supply generator and to provide an override signal when the current exceeds a current threshold;
    circuitry to monitor the voltage provided by the power supply generator and to provide a clamp signal when the voltage drops below a voltage threshold;
    circuitry to receive the override signal and the clamp signal, send a throttle signal to the processor core when the override signal indicates the current exceeds the current threshold, and send the throttle signal to the processor core when the clamp signal indicates the voltage drops below the voltage threshold; and
    circuitry to at least partially turn off the power supply generator, in response to the override signal, when the monitored current exceeds the current threshold, wherein:
        the power supply generator comprises a high-side switch coupled in series with a low-side switch, and an inductor coupled at one side to a point between the high-side switch of the power supply generator and the low-side switch and at another side to the power supply rail;
        the circuitry to monitor the current is coupled across the inductor and comprises an amplifier, a replica high-side switch and a summation node;
        the amplifier comprises two inputs to detect a voltage difference across the inductor and output an average current of the inductor;
        the replica high-side switch is to mimic a ripple current of the inductor; and
        the summation node is to sum the average current and the ripple current to sense the current provided by the power supply generator.

2. The apparatus of claim 1, wherein the throttle signal is a request to reduce an operating frequency of the processor core.

3. The apparatus of claim 1, wherein the throttle signal is a request to modify a divider ratio of a phase-locked loop (PLL) of the processor core.

4. The apparatus of claim 1, further comprising a clamp circuit, the clamp circuit comprising a diode, the clamp circuit to clamp the voltage on the power supply rail to a predetermined voltage level determined by a voltage drop of the diode when the clamp signal indicates the monitored voltage crossed below the voltage threshold.

5. The apparatus of claim 4, wherein the predetermined voltage level is below the voltage threshold.

6. The apparatus of claim 1, wherein the high-side switch of the power supply generator is turned off to at least partially turn off the power supply generator when the monitored current crosses the current threshold.

7. The apparatus of claim 6, wherein the circuitry to at least partially turn off the power supply generator is to turn off the high-side switch of the power supply generator for a duration of an expected voltage droop on the power supply rail.

8. The apparatus of claim 1, wherein the power supply generator comprises one of: a DC-DC converter, a buck converter, a boost converter, a low dropout (LDO) regulator, a switched capacitor voltage regulator, or a bi-directional DC-DC converter.

9. The apparatus of claim 1, wherein:
the circuitry to receive the override signal and the clamp signal, and to send the throttle signal to the processor core, comprises an OR logic gate;
the override signal and the clamp signal are inputs to the OR gate; and
the throttle signal is an output of the OR gate.

10. The apparatus of claim 4, wherein:
the power supply generator is at least partially turned off from a start to an end of a first time period; and
the clamp circuit is to clamp the voltage on the power supply rail to the predetermined voltage level from a start to an end of a second time period which is different than the first time period.

11. The apparatus of claim 10, wherein:
the start of the second time period is before the start of the first time period; and
the end of the second time period is after the end of the first time period.

12. The apparatus of claim 1, wherein the replica high-side switch comprises a current source in series with a switch.

13. A system comprising:
a power supply generator to provide a current and a voltage to a power supply rail, wherein the power supply generator comprises a high-side switch coupled in series with a low-side switch, a processor is coupled to the power supply rail, and the processor is to operate with the current and the voltage provided by the power supply rail;
a clamp circuit coupled to the power supply rail;
circuitry to monitor the current, the circuitry to monitor the current is to provide an override signal to the power supply generator in a first time period in which the current exceeds a current threshold;
circuitry to monitor the voltage, the circuitry to monitor the voltage is to provide a clamp signal to the clamp circuit in a second time period in which the voltage drops below a voltage threshold;
wherein the first time period starts after a start of the second time period and ends before an end of the second time period; and
circuitry to send a request to the processor to throttle one or more performance parameters of the processor when the current exceeds the current threshold and to throttle the one or more performance parameters of the processor when the voltage drops below the voltage threshold, wherein:
when the voltage drops below the voltage threshold, the circuitry to monitor the voltage is to provide the clamp signal to the clamp circuit to clamp the voltage on the power supply rail to a predetermined voltage level from the start of the second time period until the end of the second time period;
after the start of the second time period, the current increases toward, and then exceeds, the current threshold; and
when the current exceeds the current threshold, the circuitry to monitor the current is to provide an override signal to the high-side switch to turn off the high-side switch from the start of the first time period to the end of the first time period.

14. The system of claim 13, wherein the clamp circuit comprises a diode, and the predetermined voltage level is determined by a voltage drop of the diode when the voltage drops below the voltage threshold.

15. The system of claim 13, wherein the predetermined voltage level is below the voltage threshold.

16. The system of claim 13, wherein:
the voltage threshold to cause the clamp circuit to clamp the voltage on the power supply rail to the predetermined voltage level is a droop detect level; and
a voltage threshold to turn off the clamp circuit is higher than the droop detect level.

* * * * *